(12) United States Patent  
Kataoka

(10) Patent No.: US 8,570,846 B2  
(45) Date of Patent: Oct. 29, 2013

(54) FOCUS JUMP METHOD FOR OPTICAL DISK DEVICE AND MULTI-LAYER DISK

(75) Inventor: Takeyoshi Kataoka, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 994 days.

(21) Appl. No.: 12/609,797

(22) Filed: Oct. 30, 2009

(65) Prior Publication Data

US 2010/0265804 A1    Oct. 21, 2010

(30) Foreign Application Priority Data

Apr. 16, 2009    (JP) ................................. 2009-099521

(51) Int. Cl.  
*G11B 7/00*    (2006.01)

(52) U.S. Cl.  
USPC .................................... 369/44.27; 369/53.28

(58) Field of Classification Search  
None  
See application file for complete search history.

(56) References Cited

U.S. PATENT DOCUMENTS

| | | | |
|---|---|---|---|
| 5,740,136 A | 4/1998 | Tsutsui et al. | |
| 6,011,762 A | 1/2000 | Watanabe et al. | |
| 6,091,680 A | 7/2000 | Matsuda et al. | |
| 2001/0024408 A1* | 9/2001 | Kobayashi | 369/44.27 |
| 2002/0122360 A1 | 9/2002 | Tada et al. | |
| 2002/0122361 A1 | 9/2002 | Tada et al. | |
| 2005/0041541 A1* | 2/2005 | Tateishi et al. | 369/44.27 |
| 2005/0237889 A1 | 10/2005 | Shioura et al. | |
| 2007/0171781 A1* | 7/2007 | Imai et al. | 369/44.27 |
| 2009/0067299 A1 | 3/2009 | Chun | |

FOREIGN PATENT DOCUMENTS

| | | |
|---|---|---|
| EP | 0757345 A2 | 2/1997 |
| JP | 10-027357 A | 1/1998 |
| JP | 2000-200427 A | 7/2000 |
| JP | 2003-016660 | 1/2003 |
| JP | 2006-221749 A | 8/2006 |
| JP | 2007-200447 A | 8/2007 |

OTHER PUBLICATIONS

European Search Report for European application EP09252524 (Jun. 23, 2010).  
Japan Patent Office office action for application JP2009-099521 (Nov 20, 2012).

* cited by examiner

*Primary Examiner* — Christopher R Lamb  
(74) *Attorney, Agent, or Firm* — Kilpatrick Townsend & Stockton LLP

(57) ABSTRACT

An optical disk device for recording/reproducing information on/from a multi-layer optical disk moves a light focusing point for several layers by one focus jump. The optical disk device includes a controller to detect a level of a focus error signal to change an output level of a focus drive signal, and the controller changes timing to change the output level of the focus drive signal based on the number of layers for the focus jump.

1 Claim, 17 Drawing Sheets

US 8,570,846 B2

FOCUS JUMP METHOD FOR OPTICAL DISK DEVICE AND MULTI-LAYER DISK

The present application claims priority from Japanese application JP2009-099521 filed on Apr. 16, 2009, the content of which is hereby incorporated by reference into this application.

BACKGROUND OF THE INVENTION

The present invention relates to an optical disk device, and in particular, to a method of focus jump in a seek process to move to a desired address in recording and reproducing operations for an optical disk including a plurality of information recording layers.

For Digital Versatile Disks (DVD) and Blu-ray Disks, there are prescribed two-layer disks including two information recording layers. However, a need exists for disks of larger capacity. For such higher-capacity disks, research and development are underway to increase the number of recording layers per disk.

JP-A-2003-16660 describes a focus jump process in which before conducting the focus jump, a spherical aberration correcting element is moved under a condition such that focus servo control is within a predetermined control range and is suitably performed for a target layer.

SUMMARY OF THE INVENTION

JP-A-2003-16660 has made reference to how to move the spherical aberration correcting element at appropriate timing in the focus jump over a plurality of information recording layers. However, in an actual focus jump operation, it is required to move an objective lens in a focusing direction. For this purpose, an actuator drive signal is to be controlled. It is hence important how to control the actuator drive signal according to the number of recording layers for the focus jump.

It is therefore an object of the present invention to provide a stable focus jump for use with an optical disk including a plurality of information recording layers.

The object will be achieved, for example, by changing an output pattern of the focus drive signal in the focus jump according to the number of recording layers for the focus jump.

According to the present invention, there is provided a stable focus jump for use with an optical disk including a plurality of information recording layers.

Other objects, features and advantages of the invention will become apparent from the following description of the embodiments of the invention taken in conjunction with the accompanying drawings.

DESCRIPTION OF THE EMBODIMENTS

Figure 1:
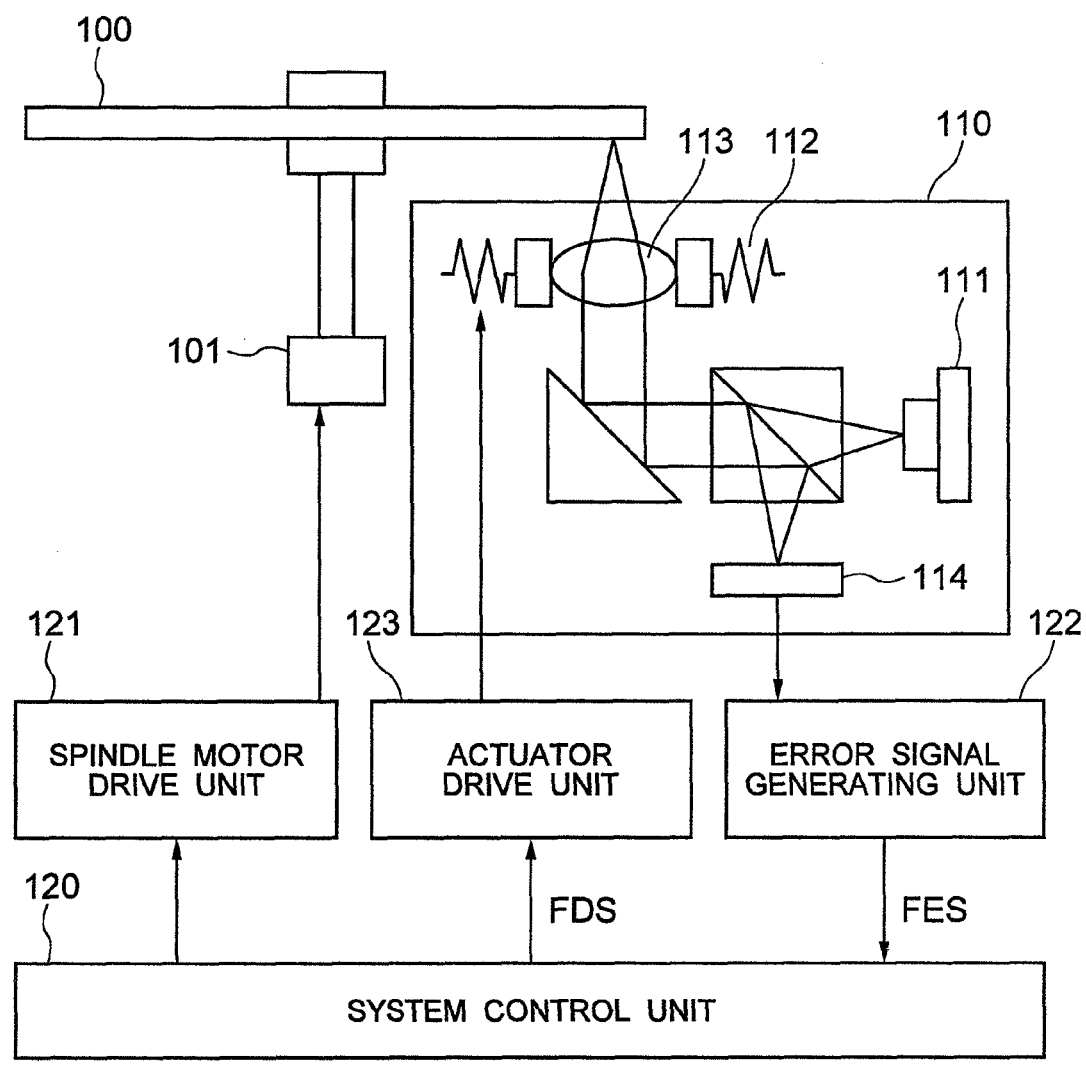
FIG. 1 is a block diagram showing a configuration of a first embodiment of an optical disk device.

Referring now to the drawings, description will be specifically given of embodiments according to the present invention.

<First Embodiment>

FIG. 1 is a block diagram showing structure of an optical disk device according to the first embodiment.

In an optical disk 100, information is written thereon and is read or erased therefrom through radiation of a laser beam from an optical pickup 110. The optical disk 100 is rotated by a spindle motor 101 driven by a spindle motor drive unit 121 having received a spindle motor drive signal from a system control unit 120. The laser beam emitted from a semiconductor laser 111 is collected through an objective lens 113 moved by an actuator 112 to form a spot, namely, an optical spot onto an information recording plane of the optical disk 100. The beam reflects off the recording plane of the disk 100 to be detected by a photodetector 114. Based on a signal thus obtained from the reflected light by use of the photodetector 114, a signal generator 122 creates a Focus Error Signal (FES) and a tracking error signal. Although not shown, the optical pickup 110 additionally includes such components as a spherical aberration correcting element and a polarizing element. Of the signals fed to the system controller 120, the focus error signal is read as a signal to indicate an amount of error between the optical spot and the information recording plane and the tracking error signal is read as a signal to indicate an amount of error in a radial direction between a pit and a track helically arranged on optical disk recording planes and the optical spot. The actuator 112 is driven by an actuator drive unit 123 having received a Focus Drive Signal (FDS) to move the actuator in a focus direction and a tracking drive signal to drive the actuator in the radial direction. As a result, the actuator 112 moves the objective lens 113 in the focus and radial directions of the optical disk 100.

Figure 2:
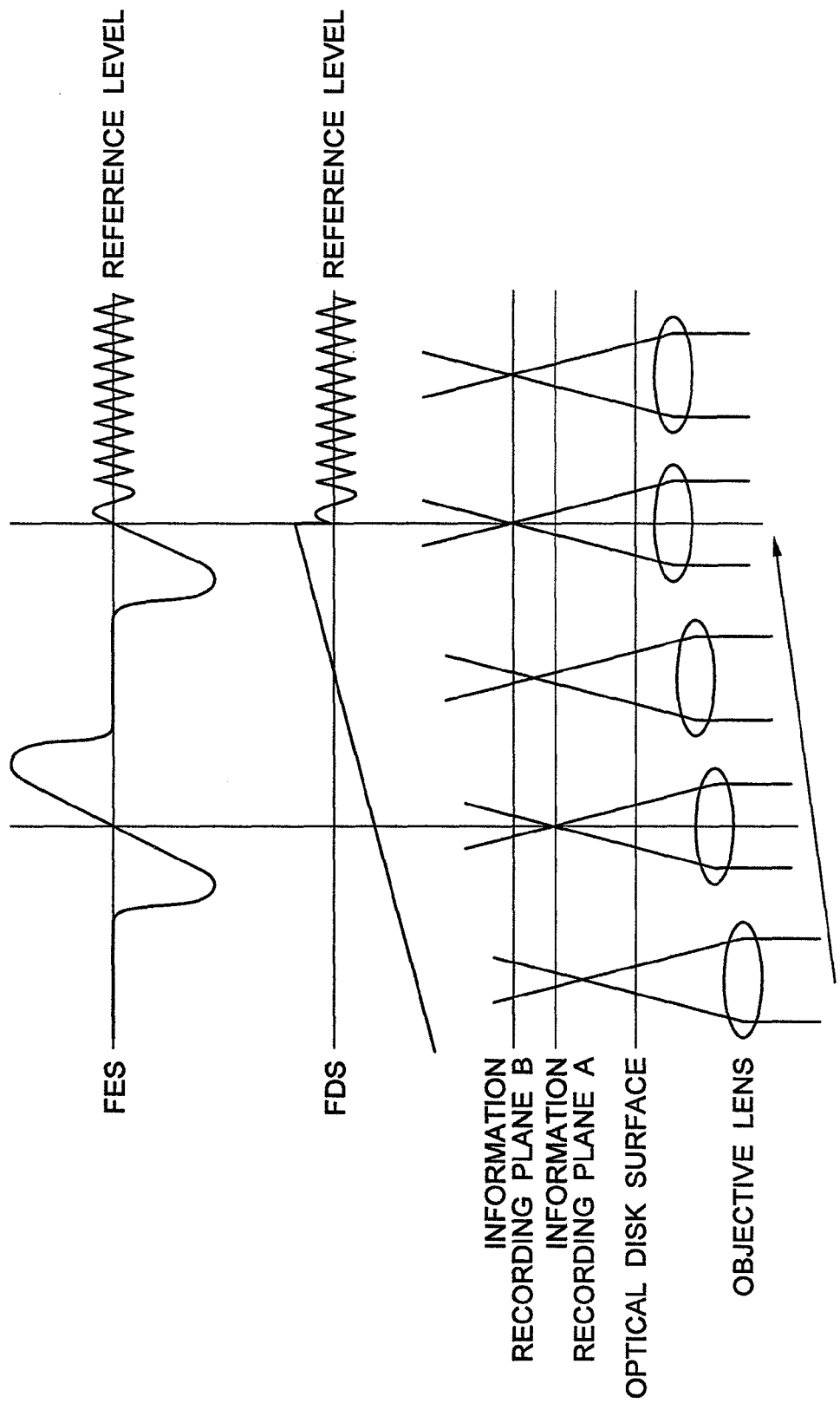
FIG. 2 is a graph showing FES and FDS waveforms in a focusing process in which an optical spot tracks an information recording plane.

FIG. 2 shows a focusing process in which the objective lens 113 is moved toward the optical disk 100 so that the optical spot tracks the information recording plane. In this example, the optical disk 100 includes two layers of information recording planes, i.e., information plane A on the upper surface side and information plane B inside the optical disk. Assume that the focusing process is carried out for information plane B. When the FDS output causes the objective lens 113 to move in a direction toward the optical disk 100, the light focusing point of the laser beam approaches information recording plane A. When the optical spot is in the neighborhood of information recording plane A, an S-shaped waveform is outputted as shown in FIG. 2. After the light focusing point passes through information recording plane A, a first half of the S-shaped waveform is detected in the proximity of information recording plane B. Thereafter, when focus servo control is performed in the proximity of the center of the S-shaped waveform, the optical spot is made to track information recording plane B. Hence, information recording and reproducing processes are enabled on information recording plane B. However, since the optical disk 100 includes two layers of information recording planes, it is required to conduct information recording and reproducing processes also on information plane A. In this connection, each of the operations to move the optical spot from information plane A to information plane B and vice versa is referred to as a focus jump.

Figure 3:
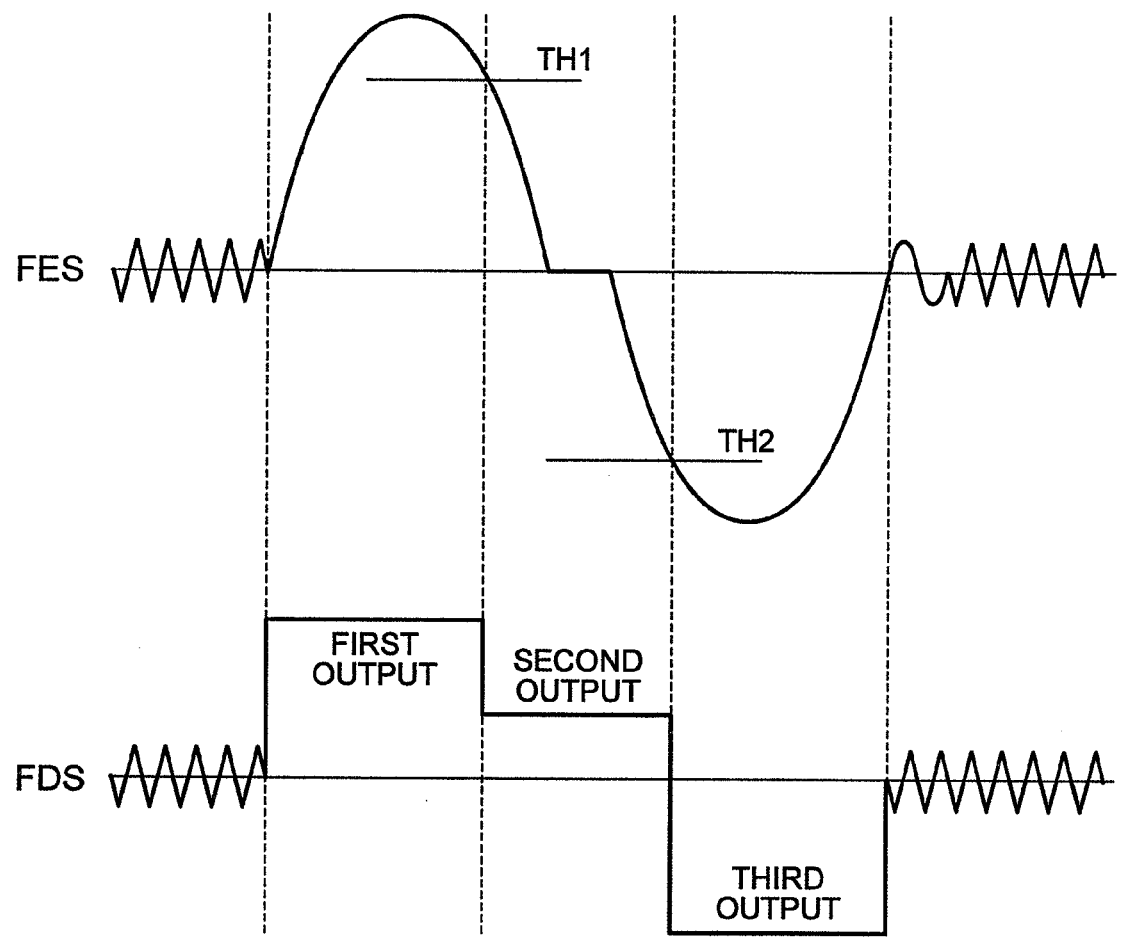
FIG. 3 is a graph showing FES and FDS waveforms in a one-layer focus jump from information plane A to information plane B of FIG. 2.

FIG. 3 shows FES and FES waveforms in a one-layer focus jump from information recording plane A to information recording plane B of FIG. 2. The feedback control loop of the focus servo control system is once released, and then a first output of FDS is produced as an acceleration signal. In FIG. 3, when the FES output downwardly intersects a threshold level TH1 in an upper section of the S-shaped waveform associated with information plane A, the FDS output is changed from the first output to second output less than the first output. Thereafter, when a lower section of the S-shaped waveform associated with information plane B is detected and the FES value downwardly intersects a threshold level of TH2, a third output of FDS is produced as a deceleration signal. Finally, when the FES value reaches the central value of the S-shaped waveform, the focus servo control system is again activated. Description has been given of the sequence of the focus jump in the present stage of art.

Figure 4:
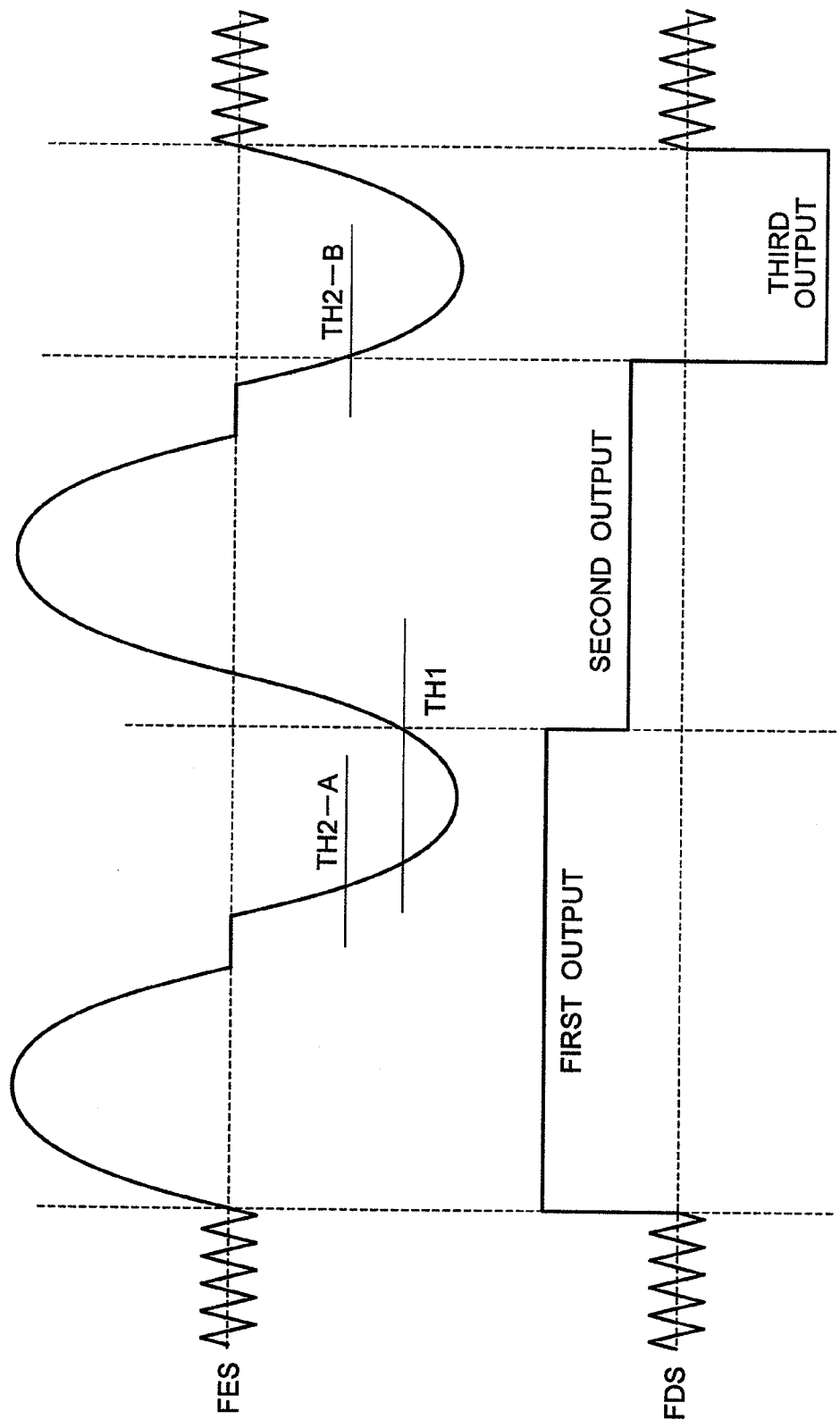
FIG. 4 is a graph showing FES and FDS waveforms in a sequence of a two-layer focus jump of the present invention.

FIG. 4 shows a sequence of a two-layer focus jump for a disk including at least three layers according to the present invention. In the two-layer focus jump, an upper section and a lower section of the S-shaped waveform appear respectively twice over and below the central-value level of the S-shaped waveform. In FIG. 4, as distinct from FIG. 3, the first output of FDS for acceleration is kept outputted in the upper section of the first S-shaped waveform. Then, in the lower section thereof, the output is also kept outputted when the FES output downwardly intersects a threshold level TH2-A. When the FES output upwardly intersects a threshold level TH1, the FDS output is changed from the first output to the second output. After this point, when the FES output downwardly intersects a threshold level TH2-B in the lower section of the second S-shaped waveform, the FDS output is changed from the second output to the third output for deceleration. Finally, when the light focusing point further approaches the target recording layer, the system sets a state in which the focus servo control system is activated. As a result, the light focusing point moves two information recording layers.

Figure 5:
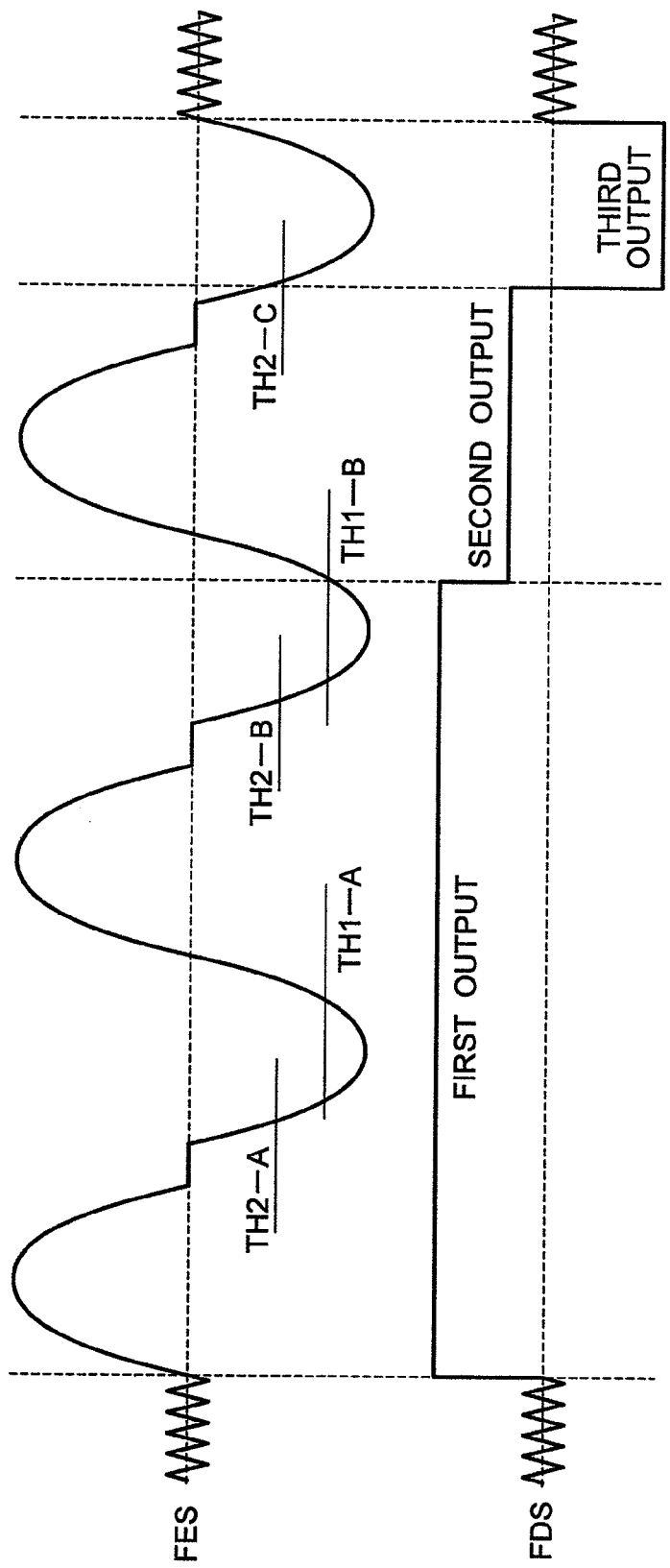
FIG. 5 is a graph showing FES and FDS waveforms in a sequence of a three-layer focus jump according to the present invention.

FIG. 5 shows a sequence of a three-layer focus jump for a disk including at least four layers according to the present invention. In the graph for the three-layer focus jump, an upper section and a lower section of the S-shaped waveform appear respectively three times over and below the central-value level of the S-shaped waveform. In FIG. 5, the first output for acceleration is kept outputted when the FES output upwardly intersects a threshold level TH1-A in the lower section of the first S-shaped waveform. When the FES output upwardly intersects a threshold level TH1-B in the lower section of the second S-shaped waveform, the FDS output is changed from the first output to the second output. When the FES output downwardly intersects a threshold level TH2-C in the lower section of the third S-shaped waveform, the FDS output is changed from the second output to the third output for deceleration. The system finally sets a state in which the focus servo control system is activated.

Figure 6:
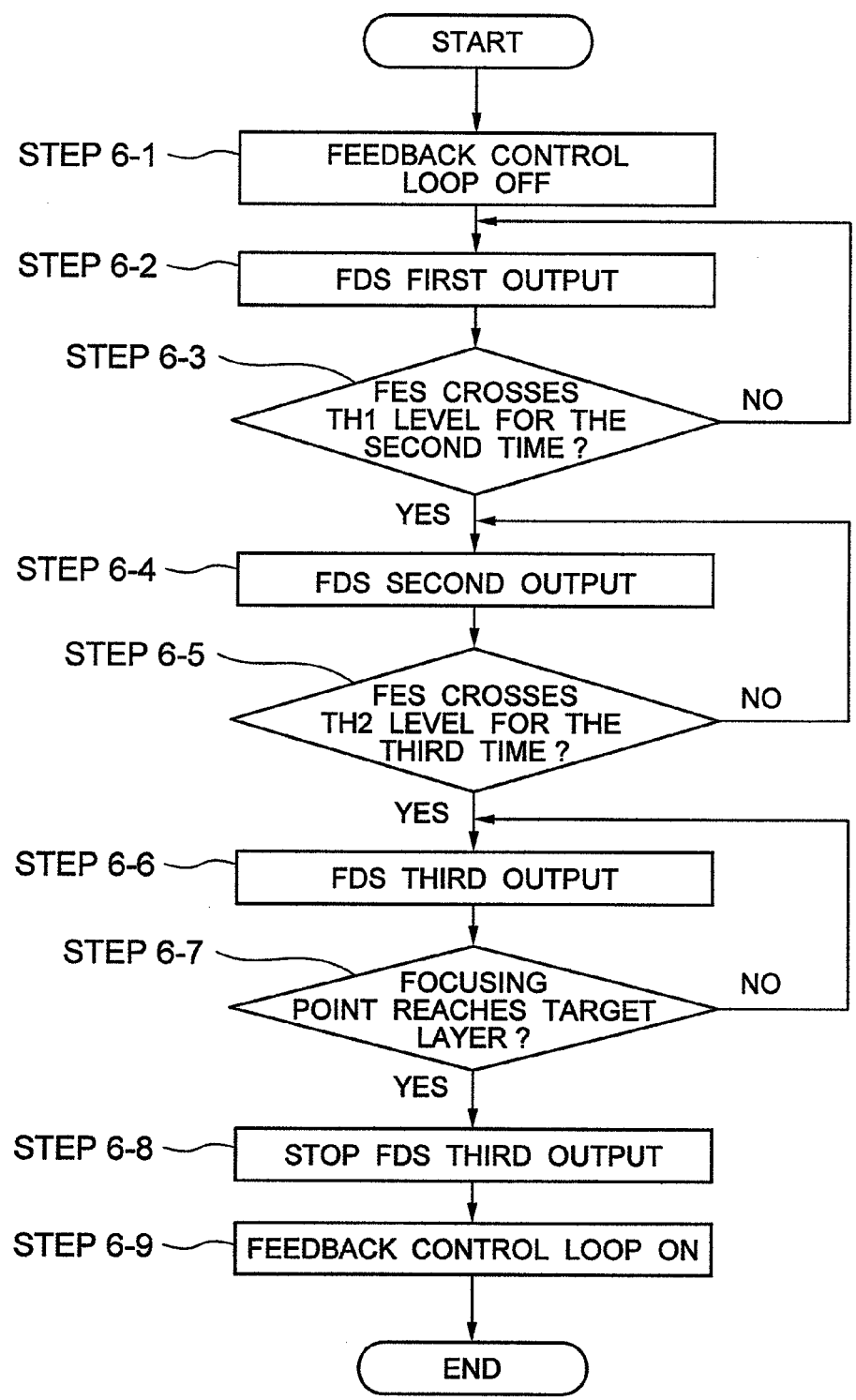
FIG. 6 is a flowchart showing operation of the three-layer focus jump of FIG. 5.

FIG. 6 shows the above process in a flowchart. First, the feedback control loop is set to an off state (step 6-1). The FDS output is set to the first output level (step 6-2). When it is detected that the FES output upwardly intersects the FES threshold level TH1, a check is made to determine whether or not this event is the second intersection (step 6-3). If this is the first intersection, the check results in "no" and the FDS output is hence kept unchanged. If this is the second intersection, the FDS output is changed to the second output level (step 6-4). When it is detected that the FES value downwardly intersects the FES threshold level TH2, a check is made to determine whether or not this event is the third intersection (step 6-5). If this is the third intersection, the check results in "yes" and the FDS output is hence changed to the third output level (step 6-6). While detecting the FES value, the system makes a check to determine whether or not the light focusing point has arrived at a target information recording plane (step 6-7). Until the arrival at the target plane is detected, the check results in "no" and the FDS output is accordingly kept unchanged. If the arrival at the target plane is detected, the check results in "yes" and the FDS output at the third output level is suspended (step 6-8). After the third output level is suspended, the feedback control loop is set to an on state (step 6-9). Then, the system terminates the three-layer focus jump processing of the flowchart of FIG. 6. Although the TH1 values are less than the TH2 values in FIGS. 4 and 5, this relationship is not necessarily required between the TH1 and TH2 values.

In the three-layer focus jump shown in FIG. 5, the FDS output is changed from the first output to the second output in the lower section of the second S-shaped waveform. However, the change may take place, as in FIG. 4, based on TH1-A in the lower section of the first S-shaped waveform according to characteristics of the optical disk device and the optical pickup 110.

In FIGS. 4 and 5, the change of FDS from the first output to the second output is initiated when the FES value intersects the threshold level TH1 after the FES output takes a minimal value. However, the FDS change may be conducted when the FES value downwardly intersects the threshold level TH1 before the FES output takes the minimal value. The FDS change point need only be determined according to characteristics or properties of the optical pickup 110.

As above, the focus jump can be stably carried out by setting timing to change the FDS output from the first output to the second output on the basis of the number of information recording layers for the focus jump.

In conjunction with the present embodiment, description has been given of the change of the FDS output from the first output to the second output. This idea may be similarly applicable to the FDS output change from the second output to the third output. For example, although not shown, to conduct a four-layer focus jump for a disk including at least five information recording layers, the FDS output is changed from the first output to the second output when the FES output intersects the TH1 level in the lower section of the second S-shaped waveform as in the three-layer focus jump process. However, the timing for the FDS change from the second output to the third output may be, for example, when the FES value intersects the TH2 level in the lower section of the fourth S-shaped waveform.

The above method may be similarly applied also to a situation employing only two outputs for acceleration and deceleration, i.e., the second output as intermediate output is not used. The method is also applicable when four or more output patterns are employed.

In the first embodiment, each of the first to third outputs is set to a fixed output level. However, since the disk is rotating, there appears axial run-out in its planes during the focus jump. Hence, in consideration of the axial run-out, a correction output may be added to each output level. This resultantly further stabilizes the focus jump.

In a situation wherein the moving direction of the light focusing point is reverse to that of the first embodiment, the sequence to detect the upper and lower sections of each S-shaped waveform of FES, the thresholds, and the FDS output levels are reversed with respect to the reference levels respectively of the associated signals.

One aspect of the present embodiment is changing the output value of the focus drive signal according to the number of information recording layers. This advantageously results in a stable focus jump even if the number of information recording layers for the focus jump becomes greater.

<Second Embodiment>

Assume that the optical disk device of the second embodiment is almost the same in structure as that of the first embodiment shown in the block diagram of FIG. 1.

Figure 7:
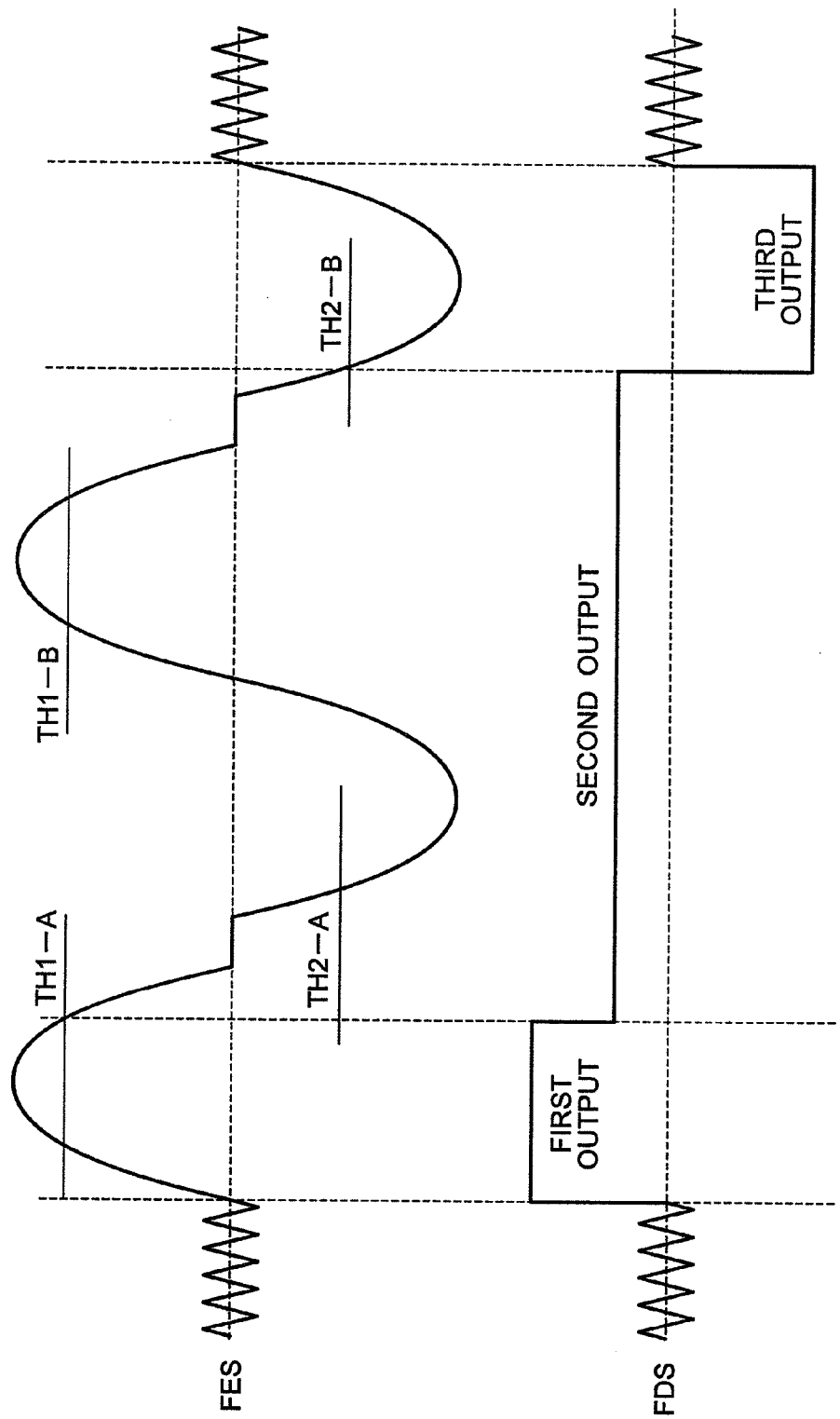
FIG. 7 is a graph showing FES and FDS waveforms in a sequence of the two-layer focus jump according to a second embodiment of the present invention.

FIG. 7 shows a sequence of the two-layer focus jump for an optical disk including at least three layers of information recording planes according to the present invention. In the two-layer focus jump process, an upper section and a lower section of the S-shaped waveform appear respectively twice above and below the reference level of the S-shaped waveform. First, as in the one-layer focus jump, the first output of FDS is produced for acceleration. When the FES output downwardly intersects a threshold level TH1-A in the upper section of the first S-shaped waveform, the FDS output is changed from the first output to the second output to thereby detect that the FES output has passed through the first S-shaped waveform. Next, at a threshold level TH2-A, it is detected that the FES output has passed through the first lower section of the S-shaped waveform. When the FES output upwardly intersects a threshold level TH1-B in the upper section of the second S-shaped waveform, the FDS output is kept unchanged at the second output. Then, when the FES output downwardly intersects a threshold level TH2-B in the lower section of the second S-shaped waveform, the FDS output is changed to the third output for deceleration. When the light focusing point arrives at the target information recording plane, the system sets a state in which the focus servo control system is activated. As a result, the light focusing point has moved two layers of information recording planes.

Figure 8:
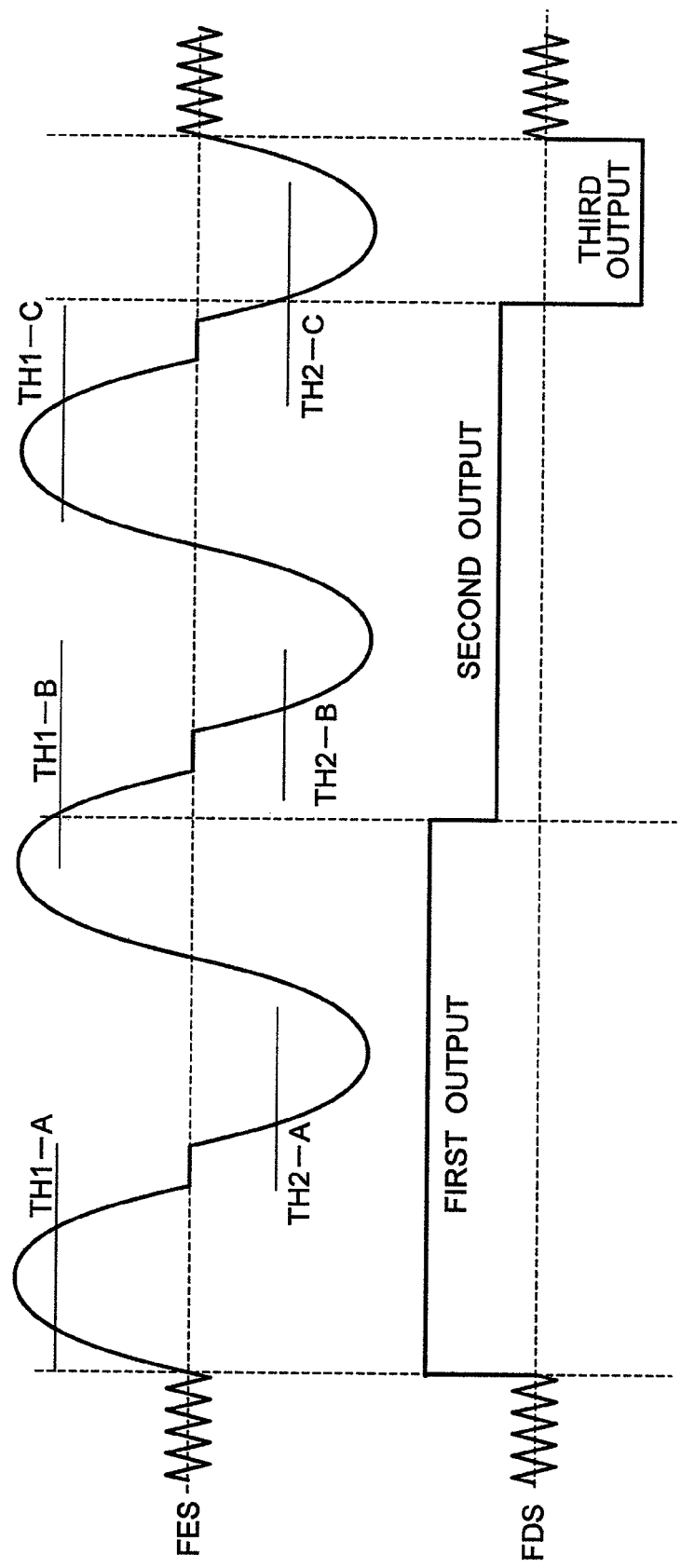
FIG. 8 is a graph showing FES and FDS waveforms in a sequence of a three-layer focus jump according to a second embodiment of the present invention.

FIG. 8 shows a sequence of a three-layer focus jump for a disk including at least four information recording layers according to the present invention. In the three-layer focus jump process, three upper sections and three lower sections of the S-shaped graph appear respectively above and below the reference level of the S-shaped graph. In FIG. 8, when the FES output downwardly intersects a threshold level TH1-A in the upper section of the first S-shaped waveform, the FDS output is kept unchanged at the first output for acceleration and is then changed to the second output by use of the second TH1-B. Thereafter, when the FES output downwardly intersects a threshold level TH2-B in the lower section of the second S-shaped waveform, the FDS output is kept unchanged at the second output. The FDS output is changed from the second output to the third output for deceleration when the FES output downwardly intersects a threshold level TH2-C in the lower section of the third S-shaped waveform. When the light focusing point arrives at the target information recording plane, the focus jump processing is terminated.

In FIG. 7, although the first output is changed to the second output by use of TH1-A, this operation may also be conducted by use of TH1-B. For the output change, the threshold level and the associated S-shaped waveform are determined according to characteristics of the optical disk device and the optical pickup 110.

Figure 9:
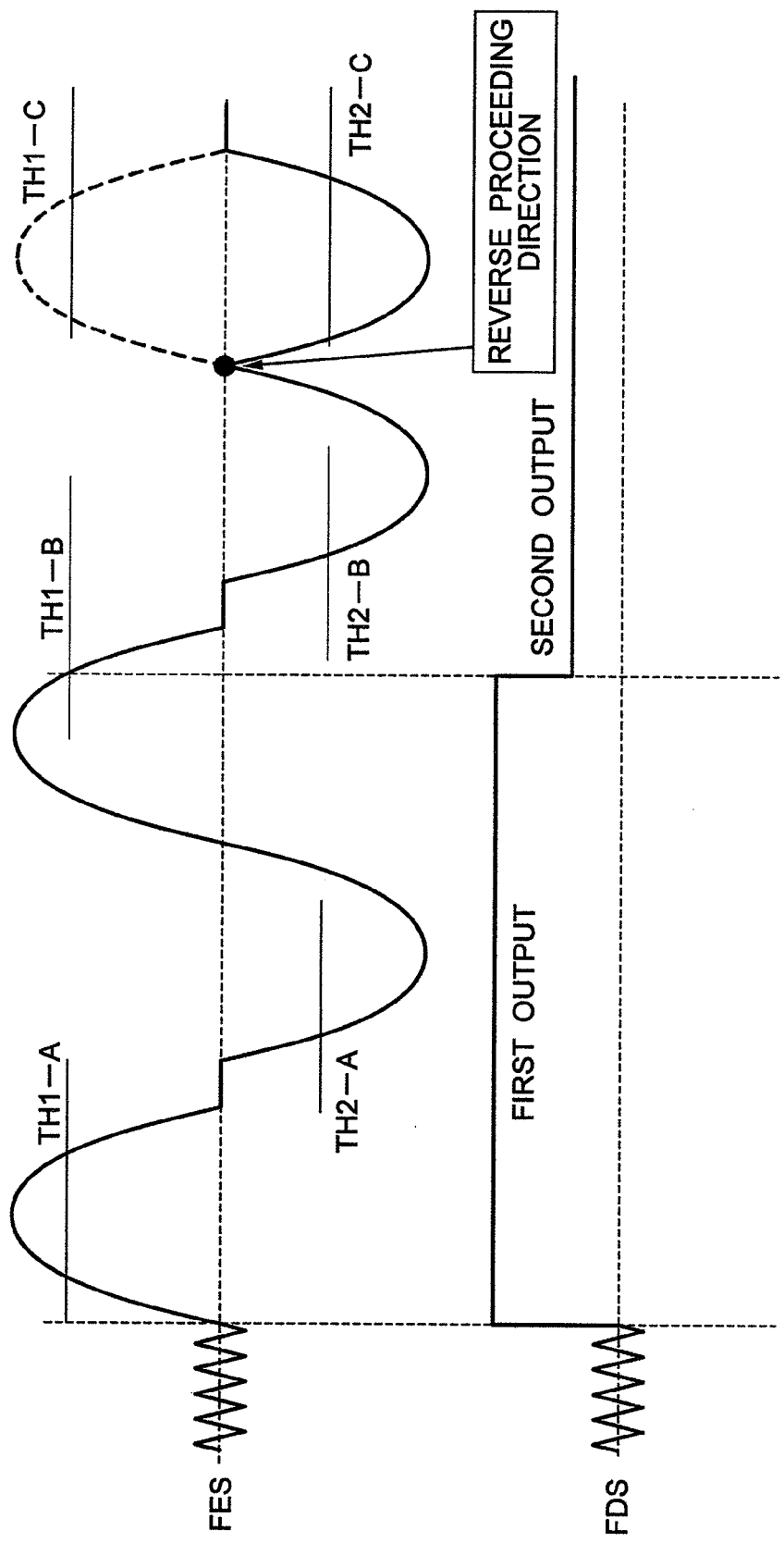
FIG. 9 is a graph showing an example of failure in a focus jump in which the relative proceeding direction is reversed according to the second embodiment.

In the focus jump waveforms of the second embodiment shown in FIGS. 7 and 8, the S-shaped waveform sections of FES are substantially equal in magnitude. However, actually, the amplitude varies between the S-shaped waveform sections due to influence from spherical aberration and the like. Also, as FIG. 9 shows, the relative proceeding direction is reversed during the focus jump depending on cases. To handle such cases, it is required to set each threshold for each S-shaped waveform section so that the intersection thereof is detected during the focus jump.

In the second embodiment, as distinct from the first embodiment, TH1 and TH2 are set to oppose each other with the reference level therebetween. Hence, by detecting an event in which the threshold levels are sequentially intersected, it can be confirmed that the S-shaped waveform sections are sequentially detected in an appropriate fashion. For example, in the S-shaped waveform shown in FIG. 9, the FES value intersects the TH2-B level and then the TH1-C level if the proceeding direction of the light focusing point is not reversed. However, since the direction is reversed, the FES value intersects the TH2-C level without intersecting the TH1-C level. In this situation, the TH1 level and the TH2 level are not sequentially intersected. Hence, failure of the focus jump can be assumed.

In the second embodiment, TH1 is above the reference level and TH2 is below the reference level. However, the TH1 and TH2 values may be reversely set.

The second embodiment is substantially equal to the first embodiment in that the FDS output is changed according to the number of information recording layers for the focus jump. However, the second embodiment additionally has an aspect that in the optical disk device, at least one threshold to determine timing for the FDS output change is respectively set over and below the reference level of the focus error signal.

<Third Embodiment>

Assume that the optical disk device of the third embodiment is almost the same in structure as that of the first embodiment shown in the block diagram of FIG. 1.

In the first embodiment, the timing to change the focus drive output is determined according to the number of layers for the focus jump. The thresholds are disposed on one side relative to the reference level of the focus error signal. On the other hand, in the second embodiment, at least one threshold is respectively set over and below the reference level of the focus error signal.

In the third embodiment, as in the first and second embodiments, the timing to change the focus drive signal output is changed according to the number of layers for the focus jump. In addition, the thresholds are set respectively over or below the reference level of the focus error signal also according to the number of layers for the focus jump.

For example, when the number of information recording layers for the focus jump is odd, the S-shaped waveform is divided according to the reference level of the focus error signal. The thresholds are set to the upper or lower side of the level to be first detected in the focus jump. When the number of information recording layers for the focus jump is even, the thresholds are set to the side opposite to that of the level to be first detected in the focus jump. That is, when the number of information recording layers for the focus jump is even, for example, two or four, the system operates as shown in the two-layer focus jump of FIG. 4. When the number of information recording layers for the focus jump is odd, for example, three or five, the system operates as indicated by the three-layer focus jump shown in FIG. 8.

Figure 10:
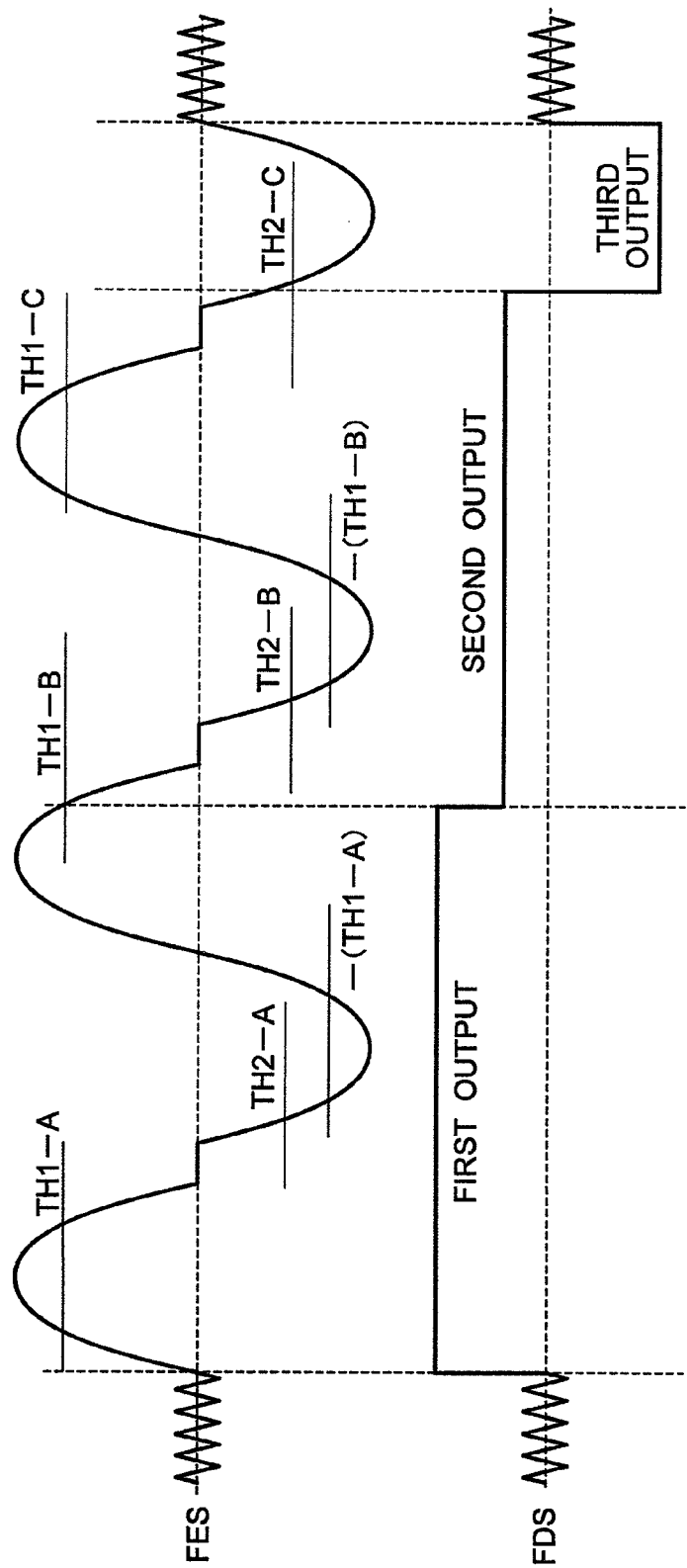
FIG. 10 is a graph showing FES and FDS waveforms in a sequence of a three-layer focus jump according to a third embodiment of the present invention.

FIG. 10 shows a sequence of a three-layer focus jump for a disk including at least four information recording layers according to the present invention. Each threshold TH1 is set in the upper section of the S-shaped waveform for the odd focus jump in which the number of layers for the focus jump is odd. Each threshold −(TH1) is disposed in the lower section of the S-shaped waveform for the even focus jump in which the number of layers for the focus jump is even.

In FIG. 10 showing an example of the three-layer focus jump, the first output of FDS is changed to the second output based on a threshold value TH1-B in the upper section of the S-shaped waveform. In the third embodiment, each threshold value TH2 as a point of timing for the change from the second output to the third output is set to the lower section of the pertinent S-shaped waveform regardless of whether the number of layers for the focus jump is odd or even. Reversion of the S-shaped waveform is detected by use of TH1 and −(TH1).

Figure 11:
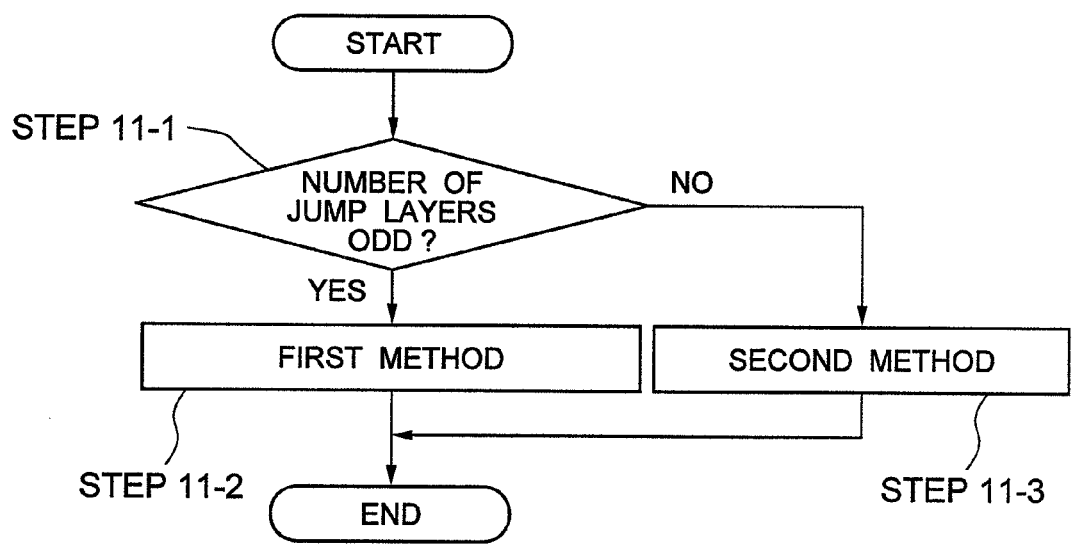
FIG. 11 is a flowchart showing the three-layer focus jump of FIG. 10.

FIG. 11 shows a flowchart of the operation described above. Assume that the method for the change based on TH1 is referred to as a first method and the method for the change based on −(TH1) is referred to as a second method. First, a check is made to determine whether the number of layers to move the light focusing point is even or odd (step 11-1). If the number of layers is odd, the focus jump is carried out in the first method (step 11-2). If the number of layers is even, the focus jump is carried out in the second method (step 11-3). The focus jump processing of the flowchart shown in FIG. 9 is then terminated.

When compared with the first and second embodiments, the third embodiment is able to improve output time balance between the first and second outputs. The thresholds may be set not only based on whether the number of layers for the focus jump is even or odd, but may also be appropriately set according to configurations of the optical disk device and the optical pickup 100 and the number of layers for the focus jump.

Each threshold value TH2 is fixedly set in the lower section of the S-shaped waveform. Like the TH1 values, the TH2 values may also be set in the upper or lower section according to the number of layers for the focus jump. In this case, the TH2 values may be used to detect the reversion of the S-shaped waveform.

<Fourth Embodiment>

Assume that the optical disk device of the fourth embodiment is almost equal in structure to the first embodiment shown in the block diagram of FIG. 1.

In the first to third embodiments, the thresholds are set such that the FDS output is changed at timing when an associated threshold level is intersected. In the fourth embodiment, no threshold is employed. The FDS output level is changed, for example, when a maximal point of the focus error signal is detected or when the reference level is intersected.

Figure 12:
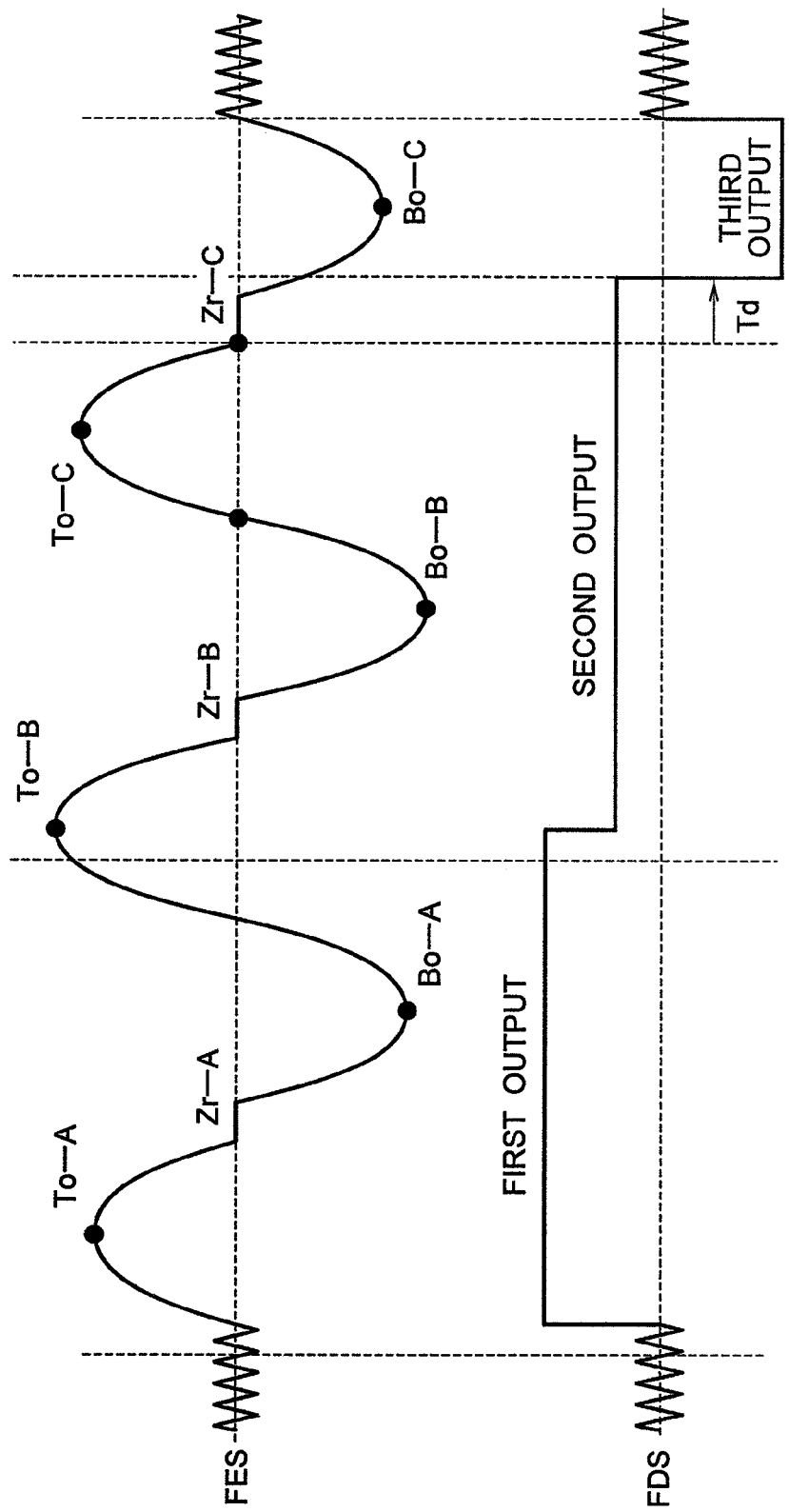
FIG. 12 is a graph showing FES and FDS waveforms in a sequence of a three-layer focus jump according to a fourth embodiment of the present invention.

FIG. 12 shows a sequence of a three-layer focus jump for a disk including at least four layers according to the present invention. In FIG. 12, the first output of FDS for acceleration is kept outputted at detection of a first maximal point To-A or a first minimal point Bo-A of the S-shaped waveform. The first FDS output is changed to the second output at detection of a second maximal point To-B. After To-B, when Zr—B of the reference level is detected, the second output is kept unchanged. After a third maximal point To-C, Zr—C of the reference level is detected. Thereafter, when a time Td lapses, the second output of FDS is changed to the third output for deceleration.

Figure 13:
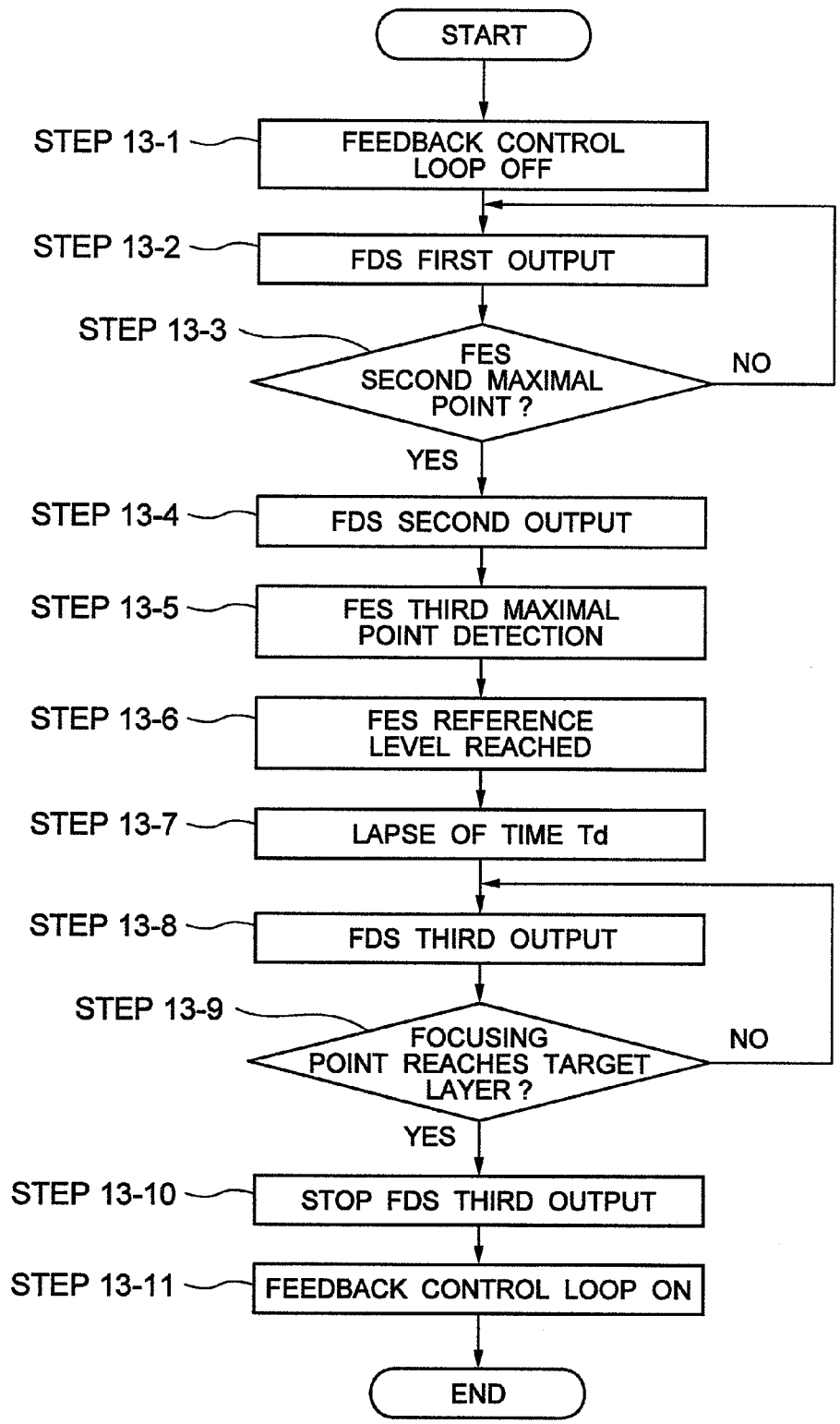
FIG. 13 is a flowchart showing the operation of the three-layer focus jump of FIG. 12.

FIG. 13 shows the above operation in a flowchart. First, the feedback control loop is set to an off state (step 13-1). The FDS output is set to the first output level (step 13-2). When it is detected that the FES signal takes a maximal value, a check is made to determine whether or not this is the second maximal point (step 13-3). If this is the first maximal point, the check results in "no" and the FDS output is accordingly kept unchanged. If this is the second maximal point, the FDS output is changed to the second output level (step 13-4). The system detects that the FES output takes the third maximal point (step 13-5). The system detects that the FES output reaches the reference level (step 13-6). The system waits for a lapse of time Td (step 13-7). During the operation, the FDS output is kept at the second output level. When the period of time Td lapses, the FDS output is changed to the third output level (step 13-8). While detecting the FES, the system makes a check to determine whether or not the target information plane has been reached (step 13-9). Until an event in which the target information plane has been reached is detected, the check results in "no" and control returns to step 13-8 to keep the FDS output level. If it is detected that the target information plane has been reached, the check results in "yes" and the third output level is suspended (step 13-10). Thereafter, the feedback control loop is set to an on state (step 13-11). The three-layer focus jump processing of flowchart shown in FIG. 11 is then terminated. The period of time Td is a setting value employed to provide appropriate deceleration, namely, to slightly delay the starting point of deceleration by the third output.

The example of FIG. 12 is the three-layer focus jump in which a maximal point is employed as timing to change the first output to the second output. However, for this purpose, a minimal value may also be used or it is possible to select a maximal value or a minimal value according to the number of layers for the focus jump. In addition, the reference level used to change the FDS output to the third output may also be used. The maximal and minimal points may also be employed as timing to change the FDS output to the third output.

To detect the maximal and minimal points, there may be used a method in which a differential signal of the Focus Error Signal (FES) is generated such that a point where the value of the differential signal intersects the reference level is assumed as a maximal or minimal point.

To change the FDS output to the third output, there is employed the wait time or the lapse of the predetermined period of time Td after the reference level is reached. This method may also be used for the change from the first output to the second output.

In the method of the fourth embodiment, a maximal point, a minimal point, or a reference level is employed as timing to change the focus drive signal from an output state to a subsequent output state. Therefore, the point of timing can be detected even if amplitude of the S-shaped waveform of the focus error signal changes for each information recording plane due to spherical aberration and the like.

<Fifth Embodiment>

Assume that the optical disk device of the fifth embodiment is almost equal in the configuration to the first embodiment shown in the block diagram of FIG. 1.

In operation of a multi-layer disk, the state of laser aberration varies for each layer. This attenuates the focus error signal (FES) and reduces the maximum amplitude of the FES. Hence, there likely occurs a situation wherein the system cannot detect the intersections of the threshold levels.

Figure 14:
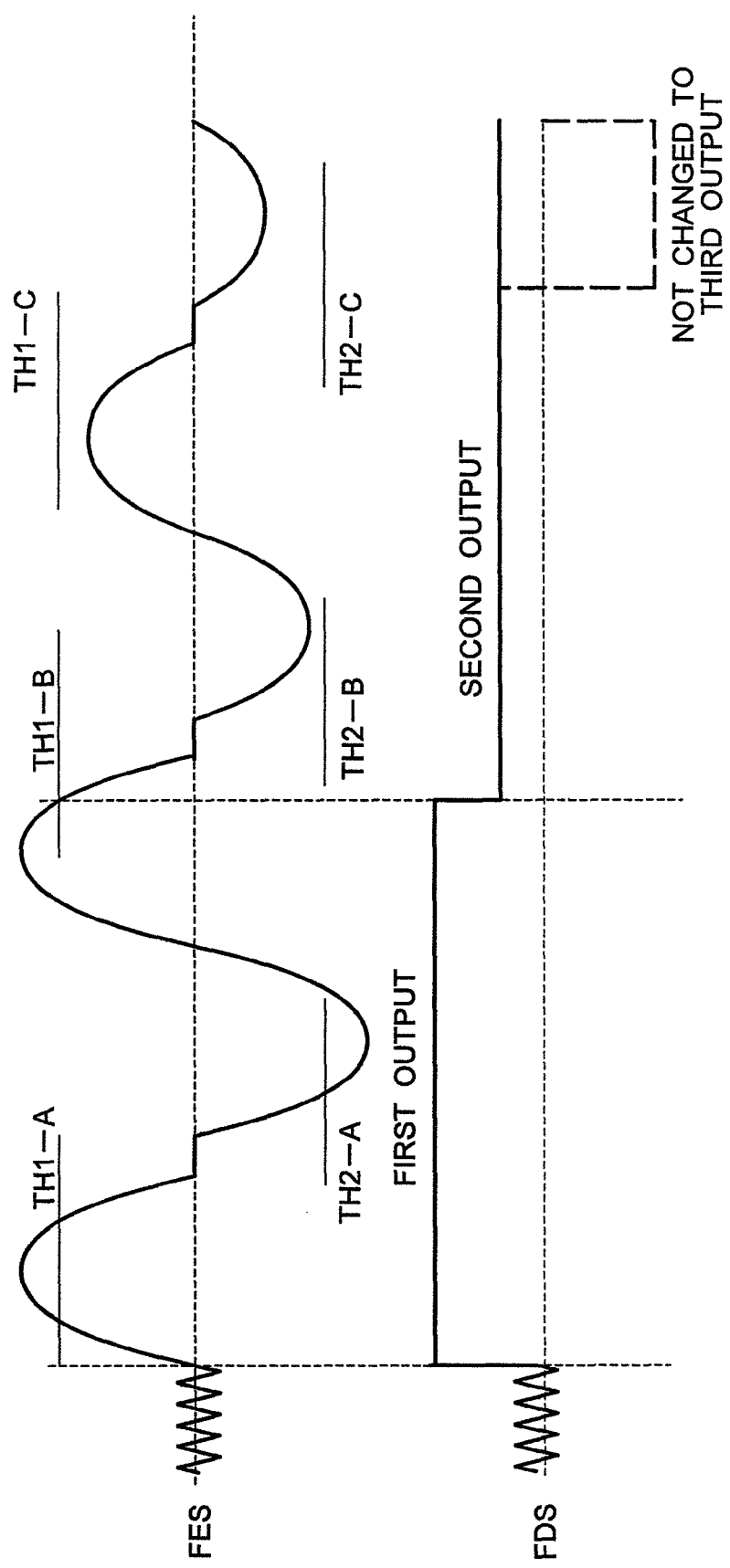
FIG. 14 is a graph showing FES and FDS waveforms when the three-layer focus jump fails according to a fifth embodiment of the present invention.

FIG. 14 shows an example of a focus jump waveform in which intersections cannot be detected due to variation in amplitude of the focus error signal in the three-layer focus jump described in conjunction with FIG. 8. After the focus jump process is started, the first S-shaped waveform of the information recording plane is large in amplitude and the intersection is detected by using the threshold level TH2-A. On the other hand, the second S-shaped waveform thereof is small in amplitude and cannot intersect the threshold level TH2-B. That is, the intersection cannot be detected. Additionally, for the target layer, namely, the third layer, the S-shaped waveform is also small in amplitude and the intersection cannot be detected. Hence, the FDS output cannot be changed to the third output. This results in failure in the focus jump. In this situation, depending on the focus jump direction, it is likely that the objective lens 113 or part of the optical pickup 110 collides with the optical disk 100.

Figure 15:
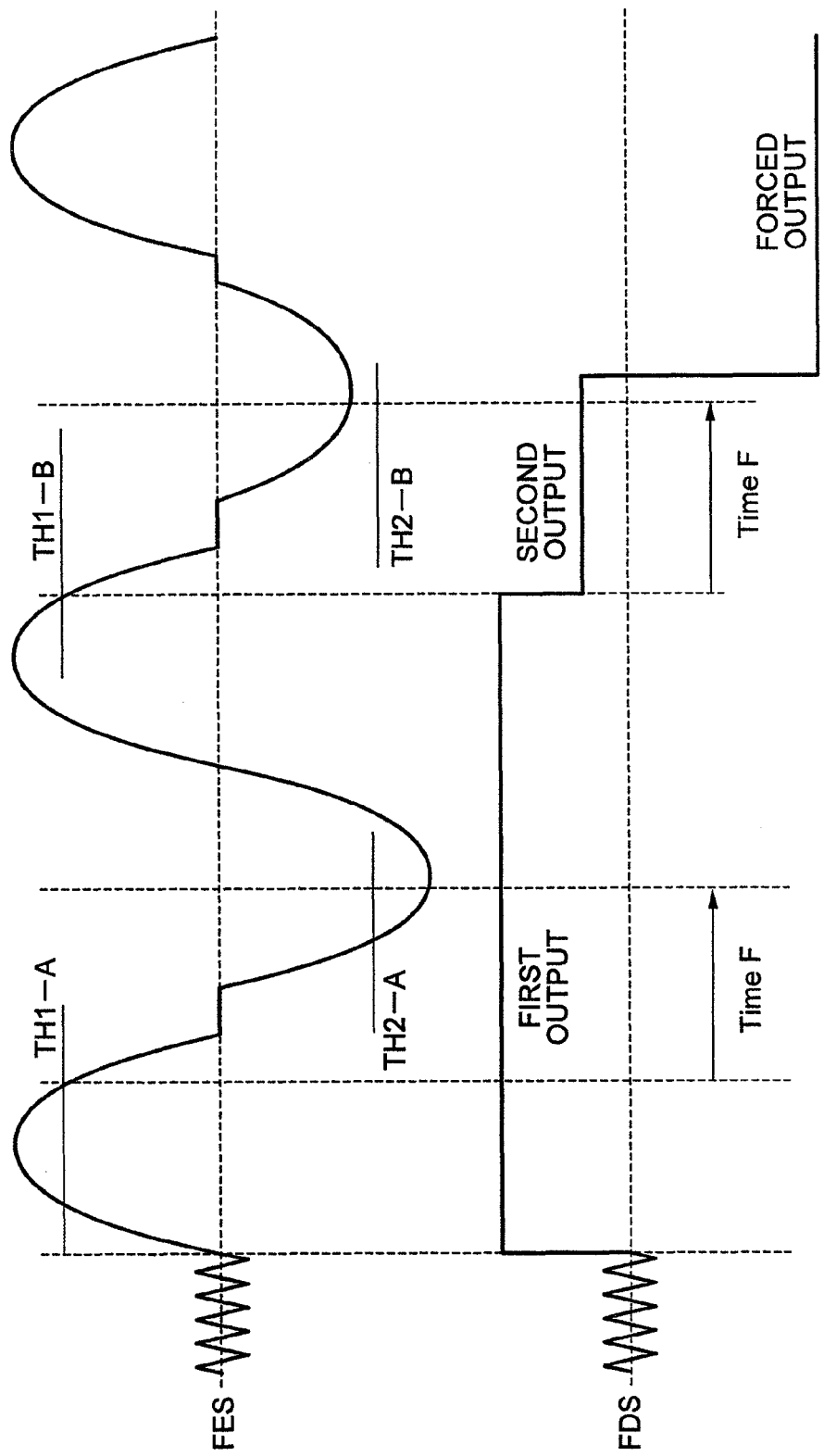
FIG. 15 is a graph showing operation of a method of detecting failure in the focus jump of FIG. 14.

FIG. 15 shows a method of detecting failure in the focus jump. By setting a period of time F, the system measures a period of time lapsed from a threshold to a next threshold. If the time is more than time F, it is determined that the focus jump has failed. In FIG. 15, after the intersection of TH1-A, the intersection of TH2-A is detected within time F. However, since the focus error signal attenuates after the intersection of TH1-B is detected, the intersection of TH2-B cannot be detected within time F. In this situation, to prevent the objective lens 113 or part of the optical pickup 110 from colliding with the optical disk 100, a forced output of FDS is produced to move the objective lens 113 and the optical pickup 110 away from the optical disk 100.

Figure 16:
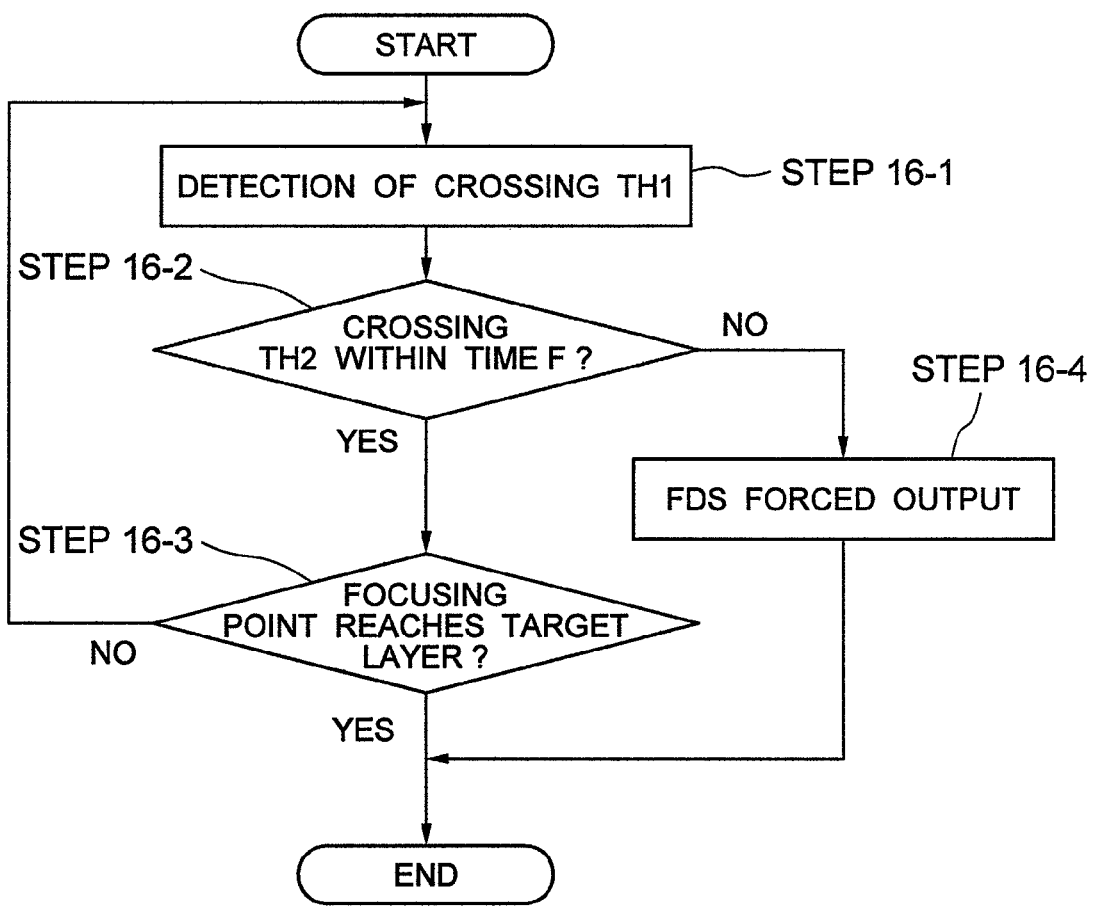
FIG. 16 is a flowchart showing the operation of the method of detecting failure in the focus jump of FIG. 15.

FIG. 16 shows the operation of the focus jump of FIG. 15 in a flowchart. After the focus jump process is initiated, an event in which the FES output downwardly intersects the threshold level TH1 is detected (step 16-1). A check is made to determine whether or not the FES output intersects the threshold level TH2 within time F after the intersection of TH1, (step 16-2). If it is detected in step 16-2 that the FES output intersects the threshold level TH2 within time F, the check results in "yes". Then, a check is made to determine whether or not the target layer has been reached (step 16-3). If the target layer has been reached, the check results in "yes" and hence the focus jump processing is terminated. Otherwise, the check results in "no" and control returns to step 16-1 to again detect the intersection of the threshold level TH1. In step 16-2, if the intersection of the threshold level TH2 is not detected within time F, the check results in "no" and it is assumed that the focus jump has failed. To move the objective lens 113 away from the optical disk 100, a forced FDS output is produced (step 16-4). The focus jump processing shown in the flowchart of FIG. 16 is then terminated.

In FIG. 15, the operation is conducted on the basis of a period of time from when the threshold level TH1 is intersected to when the threshold level TH2 is intersected. However, the operation may be carried out on the basis of a period of time from when the threshold level TH2 is intersected to when the threshold level TH1 is intersected. If both thresholds are employed, the condition is detected with higher precision. In this case, it is desirable to set time F to mutually different values for the following reason. For example, TH2-A and TH1-B are threshold levels for one S-shaped waveform generated for an information recording plane, but TH1-A and TH2-A are threshold levels for an S-shaped waveform generated for different information recording planes. In a multi-layer disk including three or more layers, the interval (distance) between the layers is not necessarily fixed. Hence, the detection precision is improved by setting time F on the basis of each interval between the layers.

According to the fifth embodiment, failure in the focus jump process can be detected in an earlier point of time.

<Sixth Embodiment>

Assume that the optical disk device of the sixth embodiment is almost equal in the configuration to the first embodiment shown in the block diagram of FIG. 1.

As described in conjunction with the second embodiment, due to influence from the axial run-out during the focus jump, it is likely that the moving direction of the light focusing point or the focus on the information recording plane is relatively reversed. As a result, the number of layers passed during the focus jump process differs from that of the actually passed layers, and the focus jump fails. Description will be given of a method of detecting failure in the focus jump due to the moving direction reversion in conjunction with the sixth embodiment.

An idea of the present invention resides in that if a minimal value is detected before a predetermined threshold level is intersected or a maximal value is detected before another predetermined threshold level is intersected, it is assumed that the moving direction of the focus on the information recording plane is relatively reversed.

Figure 17:
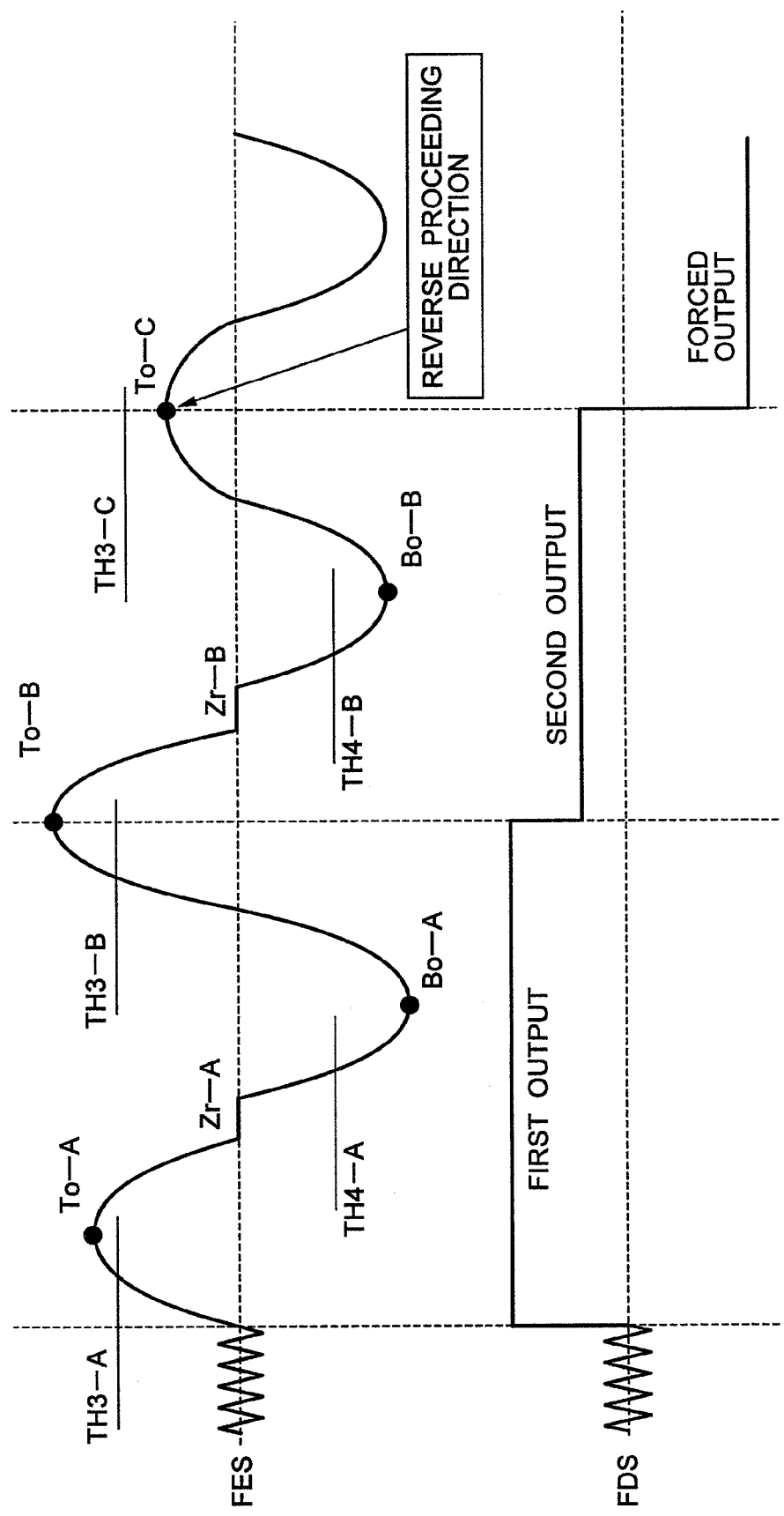
FIG. 17 is a graph showing FES and FDS waveforms when a three-layer focus jump fails according to a sixth embodiment of the present invention.

The operation will be specifically described by referring to FIG. 17. FIG. 17 shows an example of FES and FDS waveforms in a three-layer focus jump in which the focus moving direction on the information recording plane is relatively reversed due to influence from the axial run-out. After the focus jump process is started, the system detects an event in which the threshold level TH3-A is intersected, and then the system detects the first maximal amplitude value of the S-shaped waveform. Next, after detecting an event in which the threshold level TH4-A is intersected, the system detects the minimal amplitude value of the S-shaped waveform and then detects again an event in which the threshold level TH3-B is intersected in the upper section of the S-shaped waveform. The system then detects the maximal amplitude value thereof. After detecting the intersection of the threshold level TH4-B and the minimal amplitude value of the S-shaped waveform, the system detects the maximal value before the intersection of the threshold level TH3-C. Hence, the system determines that the focus moving direction has been relatively reversed. In addition, a forced output is produced to forcibly move the objective lens 113 away from the optical disk 100 as described in conjunction with the fifth embodiment.

The scheme shown in this embodiment is applicable to the first to fifth embodiments as above. In the second embodiment, the threshold levels TH1 and TH2 are employed. However, in the first to third embodiments, by setting threshold levels dedicated to the detection of the reversion of the focus moving direction, the reversion can be detected with higher precision than sharing the threshold levels TH1 and TH2.

In the sixth embodiment, the reversion of the relative moving direction of the focus can be detected at an earlier point of time in the focus jump process.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk device for reproducing information from an optical disk and/or for recording information on an optical disk by use of a laser beam, comprising:
- an objective lens for focusing the laser beam;
- an actuator for driving the objective lens;
- a photodetector for detecting reflected light from the optical disk;
- focus error signal (FES) generating means for generating a focus error signal from the reflected light detected by the photodetector;
- control means for generating and outputting a focus drive signal to control the actuator; and
- actuator drive means for amplifying the focus drive signal and supplying power to the actuator, wherein the control means sets, in a multi-layer focus jump in which the optical disk includes at least three layers of information recording planes and the control means moves a light focusing point of the laser beam at least two layers of the optical disk, timing for a change in an output level of the focus drive signal based on the number of layers for the focus jump;

wherein the timing for a change in an output level of the focus drive signal is when a maximal value or a minimal value of the focus error signal is detected or when the focus error signal reaches a reference level; and wherein when the output level of the focus drive signal is changed at detection of the maximal value and the minimal value of the focus error signal, conditions for the maximal value and the minimal value are reversed between a first case in which the number of the layers for the focus jump is odd and a second case in which the number of the layers for the focus jump is even.

* * * * *